(12) United States Patent
Kalliomaki et al.

(10) Patent No.: US 9,701,260 B2
(45) Date of Patent: Jul. 11, 2017

(54) ALLEVIATING REAR WINDOW NOISE APPARATUS

(71) Applicant: Magna Closures Inc., Newmarket (CA)

(72) Inventors: Eric V. Kalliomaki, Uxbridge (CA); Spiridon-Sorin S. Tudora, Richmond Hill (CA)

(73) Assignee: MAGNA CLOSURES, INC., Newmarket (CA)

( * ) Notice: Subject to any disclaimer, the term of this patent is extended or adjusted under 35 U.S.C. 154(b) by 0 days.

(21) Appl. No.: 15/062,251

(22) Filed: Mar. 7, 2016

(65) Prior Publication Data

US 2016/0263977 A1    Sep. 15, 2016

Related U.S. Application Data

(60) Provisional application No. 62/132,010, filed on Mar. 12, 2015.

(51) Int. Cl.
*B60R 13/08* (2006.01)
*B60J 1/20* (2006.01)
*B60R 13/04* (2006.01)

(52) U.S. Cl.
CPC ............ *B60R 13/0815* (2013.01); *B60J 1/20* (2013.01); *B60R 13/04* (2013.01)

(58) Field of Classification Search
CPC .......... B60J 1/20; B60J 10/50; B60R 13/0815
USPC ....................................................... 181/277
See application file for complete search history.

(56) References Cited

U.S. PATENT DOCUMENTS

| 4,085,665 A * | 4/1978 | Paxton ................ B60J 1/20 |
| | | 296/91 |
| 4,347,781 A | 9/1982 | Hassell |
| 4,558,634 A | 12/1985 | Oshiro et al. |
| 4,942,806 A | 7/1990 | Hwang |

(Continued)

FOREIGN PATENT DOCUMENTS

| DE | 19742741 A1 | 4/1999 |
| GB | 2252619 A | 8/1992 |

(Continued)

OTHER PUBLICATIONS

Singh, A. et al, "Buffeting Noise Computations for an Open Side Window"; Proceedings of the 37th National and 4th International Conference on Fluid Mechanics and Fluid Power (IIT Madras—Chennai, India), Dec. 16-18, 2010.

*Primary Examiner* — Forrest M Phillips
(74) *Attorney, Agent, or Firm* — Dickinson Wright PLLC

(57) ABSTRACT

An apparatus for alleviating window buffeting noise and associated vibrations along a rear window of an automotive vehicle is provided. The apparatus includes a baffle received in a recess of a B-pillar. The B-pillar is located forward of the rear window, and the baffle is disposed vertically along the B-pillar. The baffle extends over at least a portion of the height of the opening to the rear window. An actuation mechanism moves the baffle outward of the B-pillar when the window is lowered to a predetermined lower position, such that the baffle deflects air flow and thus reduces window buffeting along the open window. The actuation mechanism also retracts the baffle back into the B-pillar when the window is raised to a predetermined raised position, at which window buffeting is no longer significant.

19 Claims, 11 Drawing Sheets

(56) References Cited

U.S. PATENT DOCUMENTS

| | | |
|---|---|---|
| 5,251,953 A | 10/1993 | Willey |
| 6,068,551 A | 5/2000 | Oremland |
| 6,409,591 B1 | 6/2002 | Sullivan et al. |
| 7,367,609 B2 | 5/2008 | Grudzinski et al. |
| 7,621,588 B2 | 11/2009 | Zhu et al. |
| 7,641,275 B2 | 1/2010 | Campbell et al. |
| 7,744,147 B2 * | 6/2010 | Jeong .................. B62D 35/008 296/180.5 |
| 8,226,152 B2 * | 7/2012 | Calco ........................ B60J 1/20 296/152 |
| 2005/0095974 A1 | 5/2005 | Wijaya et al. |
| 2007/0138830 A1 | 6/2007 | Isaac |
| 2008/0113600 A1 | 5/2008 | Kim |
| 2008/0306661 A1 | 12/2008 | Campbell et al. |
| 2009/0088065 A1 * | 4/2009 | Mouch .................. B60H 1/248 454/164 |
| 2009/0121517 A1 | 5/2009 | Gulker et al. |
| 2010/0109377 A1 * | 5/2010 | Calco ........................ B60J 1/20 296/152 |
| 2013/0095738 A1 | 4/2013 | Marleau et al. |
| 2016/0221420 A1 * | 8/2016 | Bloss ....................... G05D 3/10 |

FOREIGN PATENT DOCUMENTS

| | | |
|---|---|---|
| KR | 0145570 B1 | 8/1998 |
| KR | 20010048411 A | 6/2001 |
| KR | 100783969 B1 | 12/2007 |

\* cited by examiner

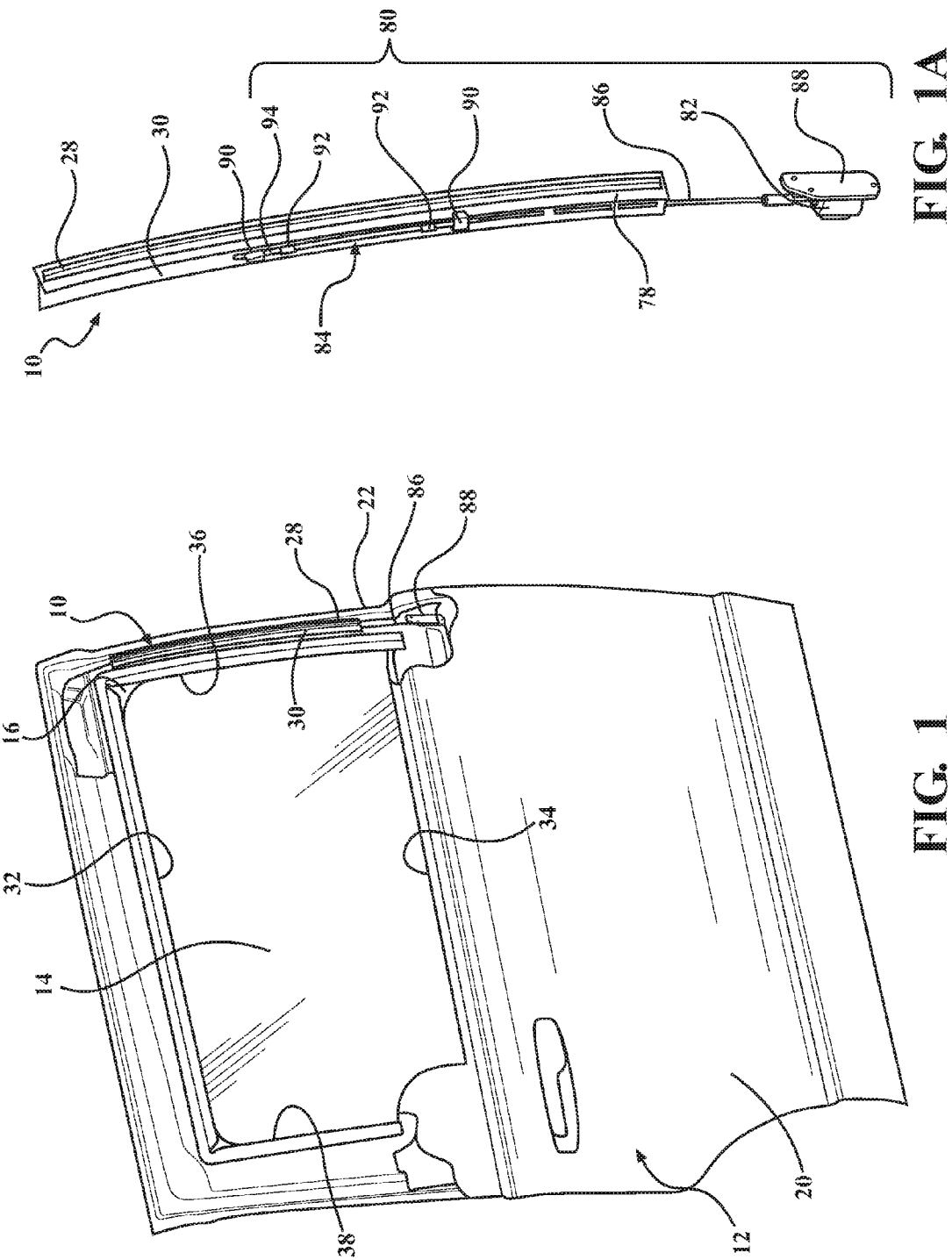

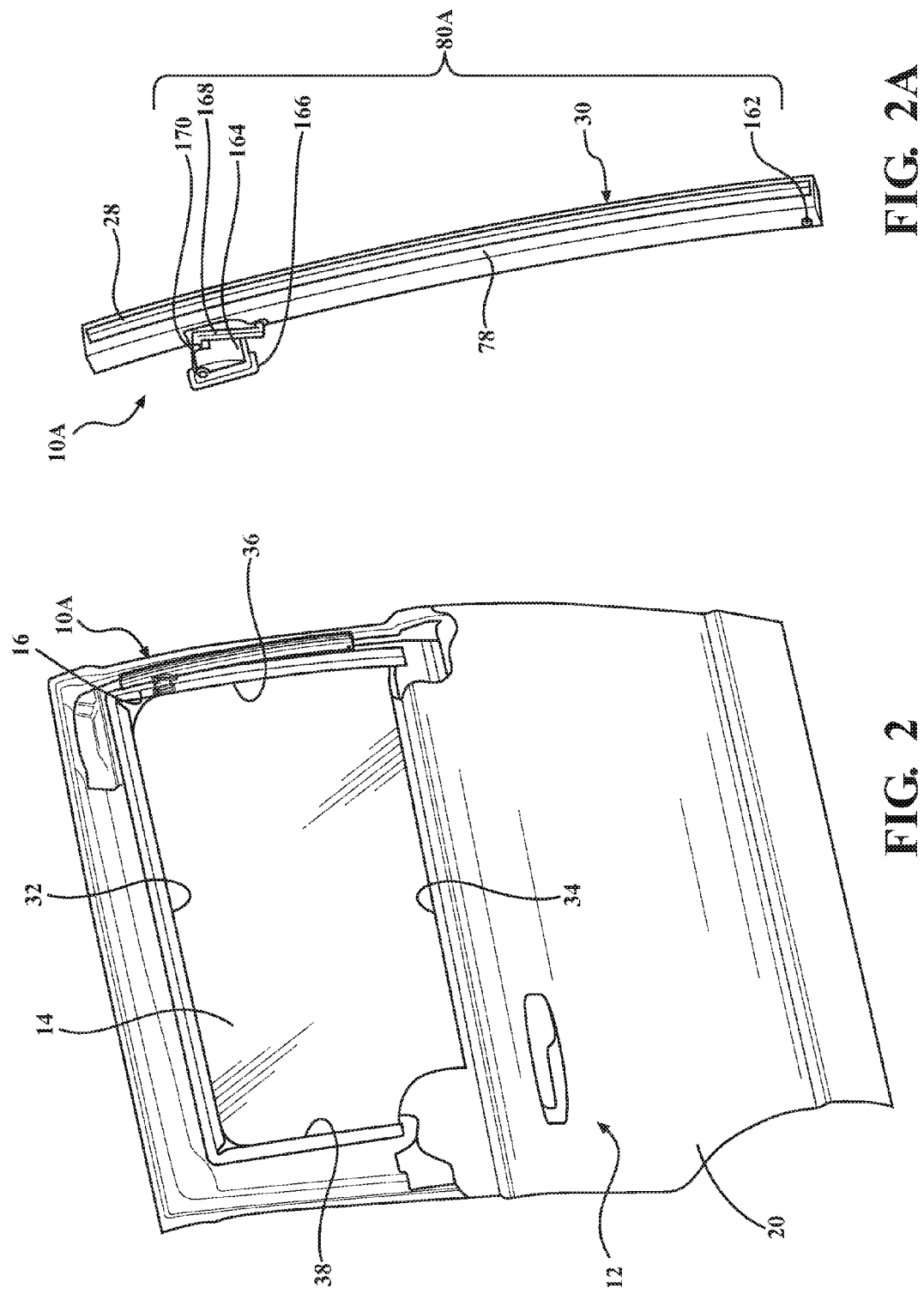

ALLEVIATING REAR WINDOW NOISE APPARATUS

CROSS-REFERENCE TO RELATED APPLICATION

This application claims priority to U.S. Provisional Patent Application No. 62/132,010, filed Mar. 12, 2015, the entire content of which is incorporated herein by reference.

FIELD

The present disclosure relates generally to an apparatus and method for alleviating window buffeting noise in an automotive vehicle.

BACKGROUND

This section provides background information related generally to the present disclosure and is not necessarily prior art.

Noise heard by occupants riding in the passenger cabin of an automotive vehicle comes from various sources including the vehicle's powertrain, the road, and window buffeting. The window buffeting noise is particularly disturbing, and unlike the other types of noise, is encountered more often in newer vehicles. Window buffeting, also referred to as wind buffeting, Helmholz resonance, or the helicopter effect, occurs when one of the windows of the vehicle is lowered to create an opening to the cabin and allow air to enter the cabin while the vehicle is in motion. Window buffeting is caused by a shear layer established at an upstream edge of the window opening to the cabin. Disturbances are shed from this location and travel along the side of the vehicle. When the disturbances reach the rear edge of the window opening, a pressure wave is generated that propagates both inside and outside the cabin. Outside the vehicle, the pressure wave propagates both forward and backward. When the forward traveling wave reaches the front edge of the window opening, it triggers another disturbance that moves back toward the rear edge of the window opening. This process is repeated many times each second and causes the shear layer to develop a characteristic buffeting frequency. The buffeting frequency and resulting noise depends on many factors which may include, for example, the size and shape of the vehicle, the position of the lowered window, the geometry of the opening created by the lowered window, the volume of the vehicle cabin, the speed of the vehicle, the relative air flow direction and speed over the vehicle body, and the temperature, pressure and density of the surrounding air. While the buffeting frequency may be below a range that can be heard by humans, the buffeting effect can still be felt by the vehicle occupants as a pulsating wind force. In addition, the associated vibration in the vehicle structure may cause undesirable resonator effects.

The window buffeting noise and associated vibrations are typically distracting and annoying to occupants riding in the vehicle. Typically, the driver eliminates the window buffeting noise and vibration by immediately closing the window, which is not ideal and may be hazardous since some of the driver's attention is taken away from the road and surrounding traffic. Although window buffeting noise is easy to measure with a microphone, the pressure waves causing the noise are difficult to analyze. Accordingly, there remains a need for an improved apparatus and method for alleviating window buffeting noise and vibrations, particularly in motor vehicle applications.

SUMMARY

This section provides a general summary of the present disclosure and is not intended to be interpreted or considered as an exhaustive and comprehensive listing of all of its aspects, objectives, features and advantages.

It is an aspect of the present disclosure to provide an arrangement or apparatus configured to alleviate window buffeting noise and vibrations associated with a window in a motor vehicle.

It is a related aspect of the present disclosure to provide a method for utilizing the arrangement or apparatus in association with the window of a motor vehicle for alleviating such buffeting noise and/or vibrations during motive operation of the motor vehicle.

In accordance with these and other aspects and objectives of the present disclosure, an apparatus for alleviating window buffeting noise and vibrations along the window of an automotive vehicle is provided. The noise alleviating apparatus comprises a baffle support located forward of an opening configured to contain the window, a baffle moveable relative to the baffle support between retracted and deployed positions, and an actuation mechanism for controlling such movement of the baffle. The window opening includes a lower edge and an upper edge defining a height dimension therebetween. The baffle is received in the baffle support and extends over at least a portion of the height of the window opening. The apparatus may further include a window position sensor for identifying when the window reaches a predetermined lowered position between the lower edge and the upper edge of the window opening or a predetermined raised position between the lower edge and the upper edge of the window opening. The actuation mechanism is coupled to the baffle. The actuation mechanism is actuated to move the baffle relative to the baffle support from the retracted position to the deployed position when the window has reached its predetermined lower position. The actuation mechanism is actuated to retract the baffle into the baffle support when the window has reached its predetermined raised position. In one embodiment, a power-operated device associated with the actuation mechanism controls movement of the baffle in response to a position signal provided by the window position sensor. In another embodiment, the actuation mechanism is actuated mechanically in response to the position of the window itself within the opening.

A method for using the noise alleviating apparatus in motor vehicles is also provided. The method includes the steps of disposing the baffle support forward of the window opening in a vehicle door which supports a moveable window, wherein the opening includes a lower edge and an upper edge defining a height dimension therebetween; and disposing the baffle in the baffle support such that the baffle extends over at least a portion of the height of the window opening. The method further includes the steps of coupling the actuation mechanism to the baffle; and actuating the actuation mechanism to move the baffle outwardly relative to the baffle support from its retracted position to its deployed position when the window has reached a predetermined lowered position, and actuating the actuation mechanism to move the baffle inwardly relative to the baffle support from its deployed position into its retracted position when the window has reached a predetermined raised position.

A method for alleviating noise along the window of the automotive vehicle is also provided. The method includes the steps of moving the baffle outwardly relative to an outer surface of the vehicle when the window reaches a predetermined lower position; and retracting the baffle into the baffle support when the window reaches a predetermined raised position.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations such that the drawings are not intended to limit the scope of the present disclosure.

FIG. 1 is a perspective view of a passenger-side rear door of an automotive vehicle equipped with a noise alleviating apparatus constructed according to one example embodiment of the present disclosure;

FIG. 1A is an enlarged view of a baffle, baffle support, and an actuation mechanism associated with the noise alleviating apparatus shown in FIG. 1 prior to installation into the rear door;

FIG. 2 is a perspective view of the passenger-side rear door of the automotive vehicle equipped with a noise alleviating apparatus constructed according to another example embodiment of the present disclosure;

FIG. 2A is an enlarged view of the baffle, the baffle support, and the actuation mechanism associated with the noise alleviating apparatus shown in FIG. 2 prior to installation into the rear door;

DETAILED DESCRIPTION

Example embodiments of a device for reducing noise and related vibrations, hereinafter referred to as a noise alleviating apparatus, configured for application with motor vehicle door systems will now be more fully described with reference to the accompanying drawings. However, it will be understood that the disclosed embodiments may take various and alternative forms. The drawings may not necessarily be to scale with some features exaggerated or minimized to better illustrate details of particular components. Therefore, specific structural and functional details disclosed herein are not intended to be interpreted as limiting, but merely as a representative basis for teaching one skilled in the art to employ the inventive concepts and arrangements associated with the present disclosure. As those skilled in the art will understand, various features illustrated and described with reference to any one of the drawings may be combined with features, illustrated in one or more other drawings to produce embodiments that are not expressly illustrated or described but which are intended to be within the scope of protection afforded the present disclosure. The combination of components and features illustrated provide representative embodiments for anticipated applications.

In accordance with the present disclosure a device for reducing noise and vibration, hereinafter referred to as a noise and vibration alleviating apparatus 10, is configured and arranged in association with a door 12 of a motor vehicle for addressing and reducing window buffeting noise and related vibrations generated in response to movement of a window 14 within a window opening 16 formed in the door 12. Additionally, a method of operating apparatus 10 is disclosed for automatically reducing the undesirable window buffeting noise and related vibration in response to certain movement of window 14 within window opening 16. With installation of apparatus 10 in door 12, the vehicle operator's attention can remain focused on the road and surrounding traffic due to the alleviation of the window buffeting noise and vibrations.

Figure 4:
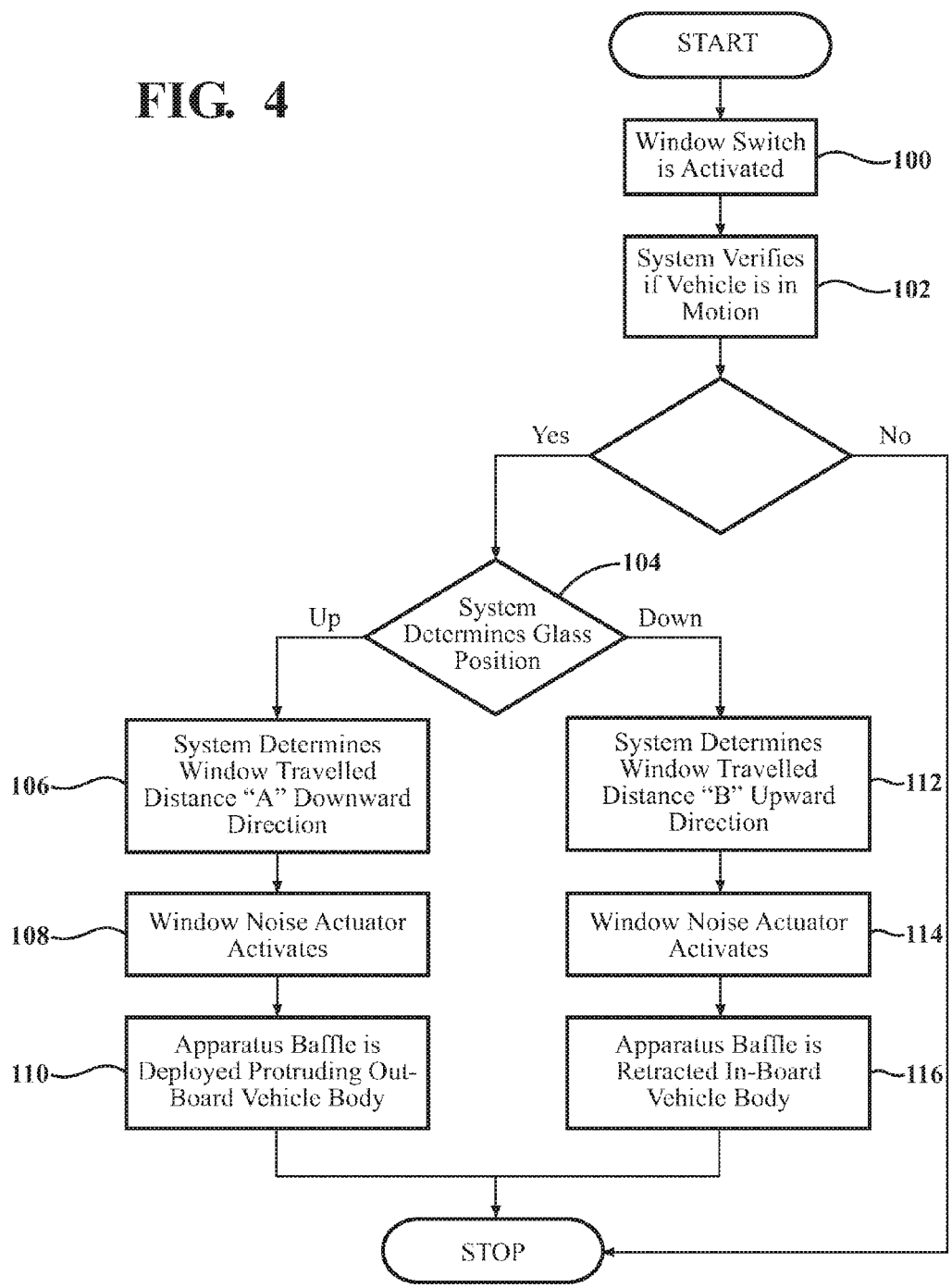
FIG. 4 is a flow chart illustrating an example system logic associated with a method for alleviating window buffeting noise and related vibration using the noise alleviating apparatus of FIG. 1.
Figure 5:
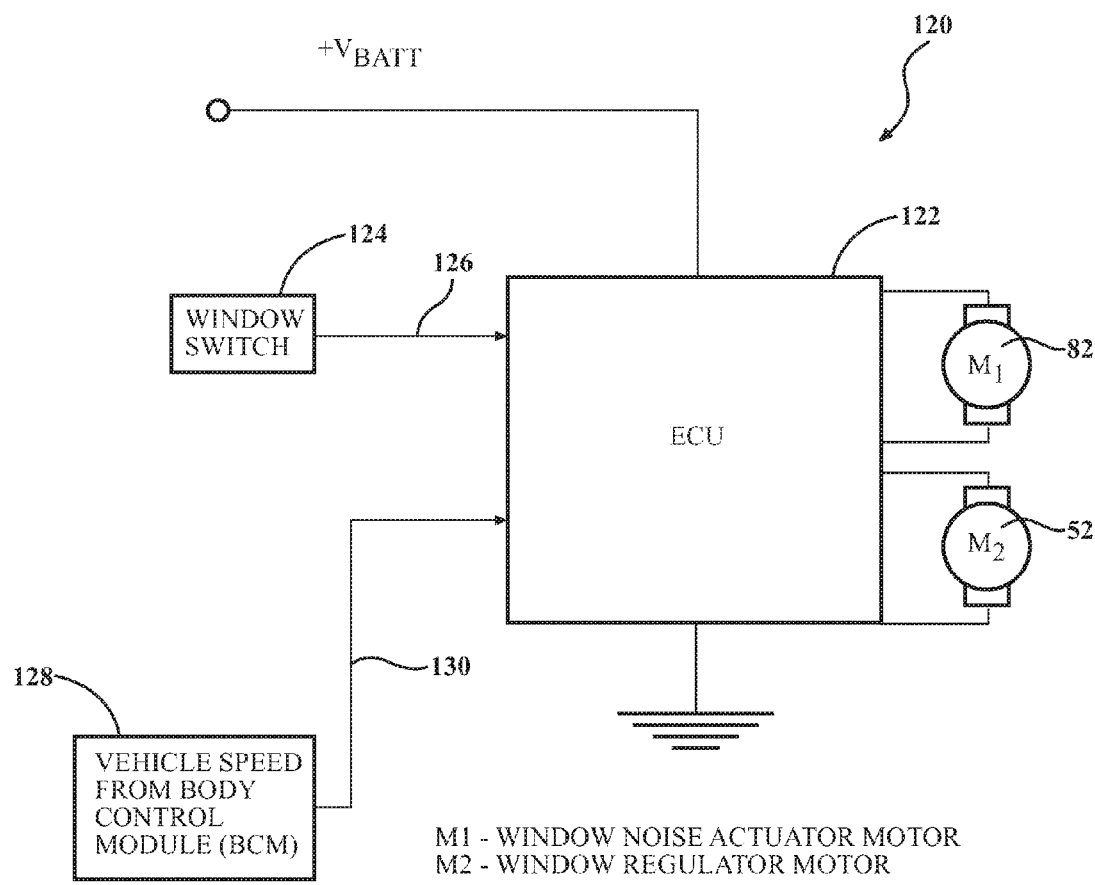
FIG. 5 is a general illustration of an electrical control system used with the noise alleviating apparatus of FIG. 1 for alleviating the noise according to an example embodiment.
Figure 6:
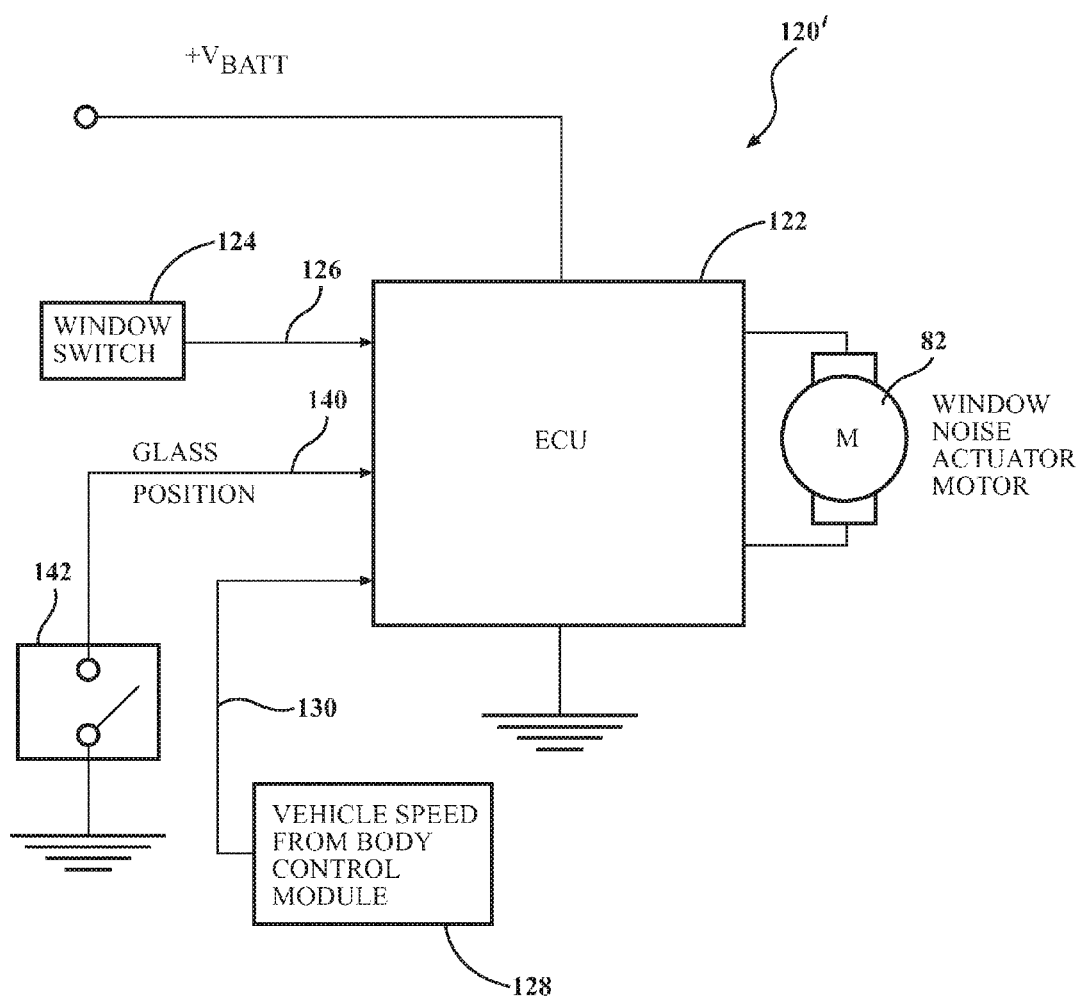
FIG. 6 is a general illustration of an alternative electrical control system used with the noise alleviating apparatus of FIG. 1 for alleviating the noise according to another example embodiment.
Figure 7:
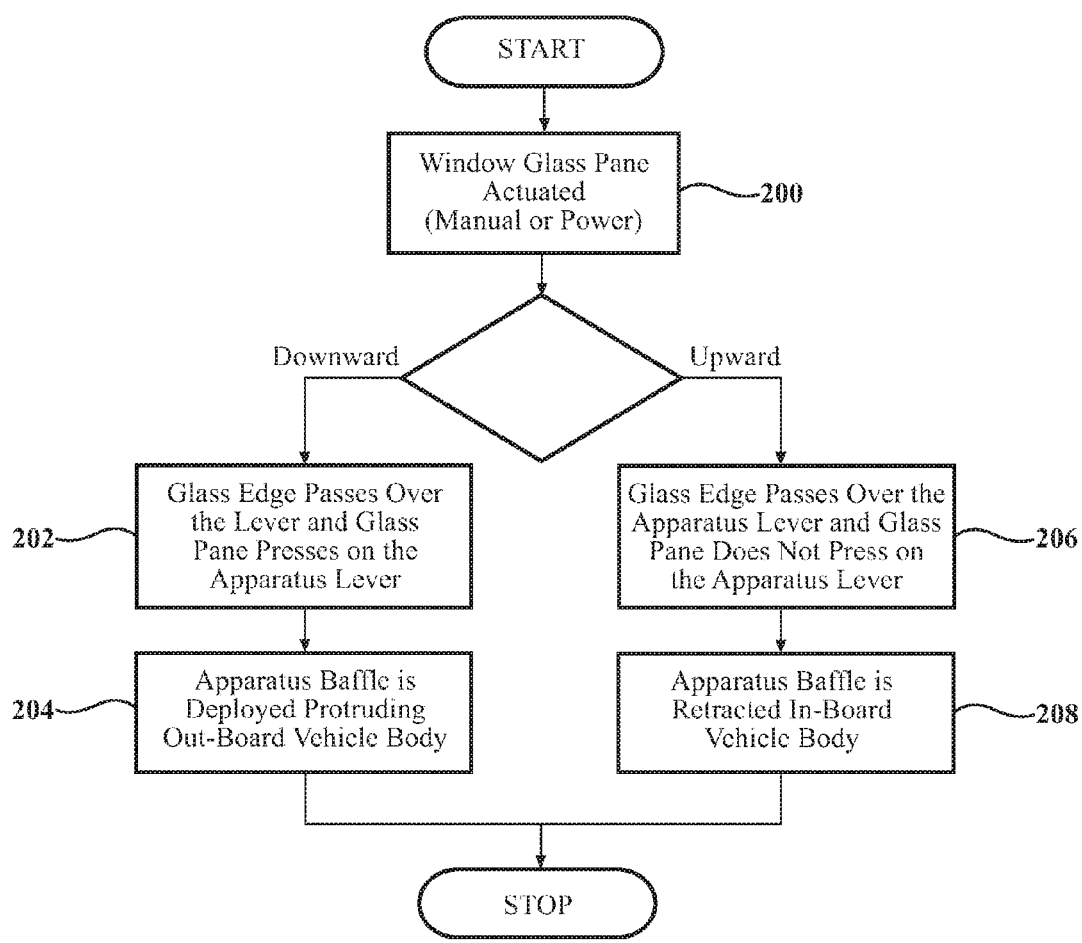
FIG. 7 is a flow chart illustrating an example system logic associated with a method for alleviating window buffeting noise using the noise alleviating apparatus of FIG. 2 or FIG. 3.

Noise alleviating apparatus 10 is preferably disposed along a B-pillar of a rear door 12 and positioned forward of a rear window 14 of the motor vehicle. Noise alleviating apparatus 10 is disposed in this non-limiting location because an open rear window 14 is known to generate the most window buffeting noise. However, noise alleviating apparatus 10 can alternatively be disposed in relation to door window systems in other locations along the motor vehicle. Example embodiments of a noise alleviating apparatus 10 disposed along the B-pillar of the vehicle, are showing in FIGS. 1-3. FIGS. 4 and 7 illustrate methods for alleviating the window buffeting noise using one or more of apparatuses 10 shown in FIGS. 1-3. FIGS. 5 and 6 illustrate additional components of the vehicle which can be used with apparatus 10 of FIG. 1. FIGS. 8-11 show the noise alleviating apparatuses 10 of the present disclosure disposed along the B-pillar, wherein an outer panel 20 of vehicle door 12 covers some components of noise alleviating apparatus 10.

Figure 3:
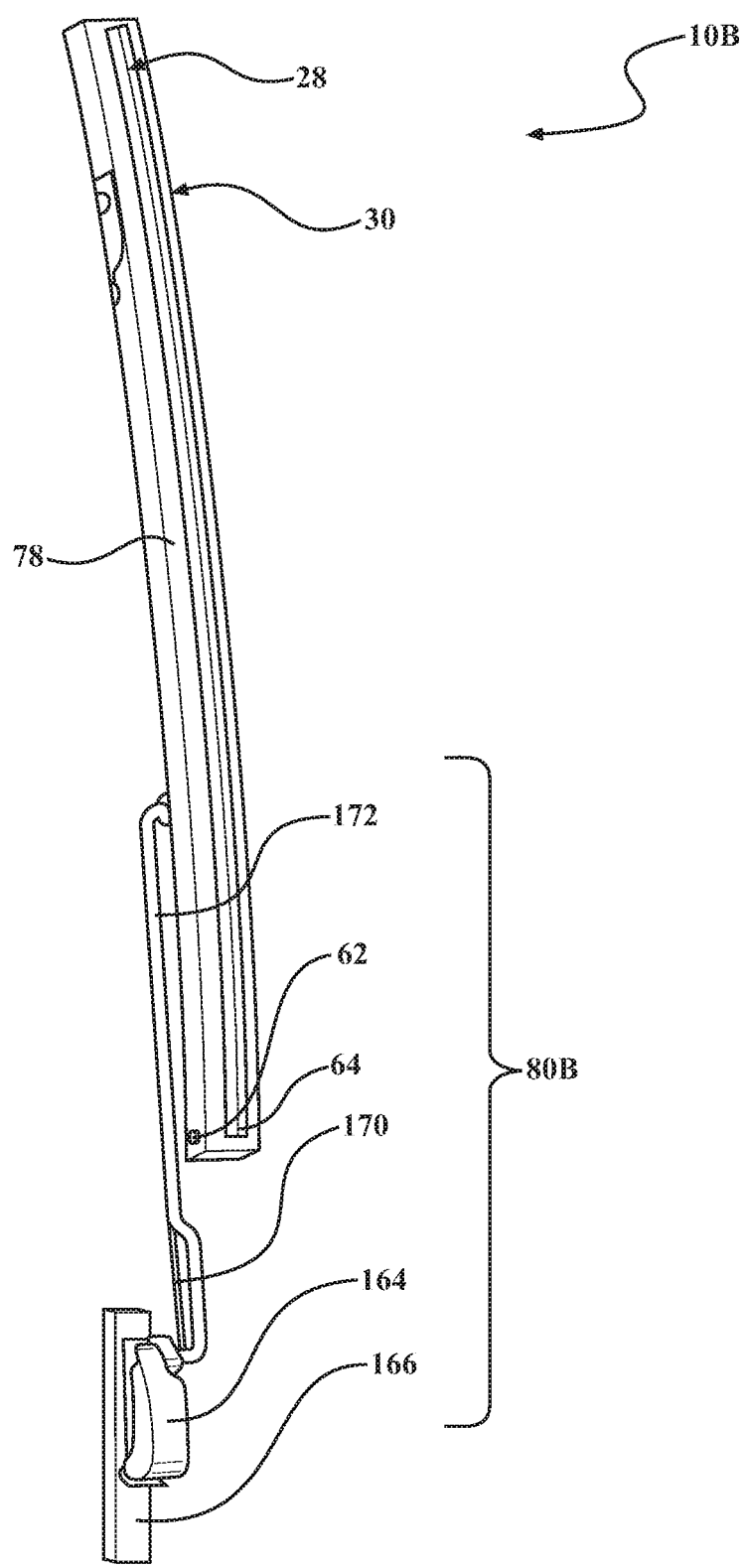
FIG. 3 is an enlarged view of the baffle, the baffle support, and the actuation mechanism associated with a noise alleviating apparatus constructed according to yet another example embodiment of the present disclosure.

As shown in FIGS. 1-3, each alternative embodiment of noise alleviating apparatus 10 generally includes a baffle 28 received in a baffle support 30. Baffle support 30 is adapted and configured to be mounted in or to a B-pillar portion 22 of door 12 so as to be disposed adjacent to window opening 16 and extends over the height of window 14. In the example embodiment, baffle support 30 is provided by B-pillar portion 22 adjacent to window opening 16 and is disposed forward of rear window 14. B-pillar portion 22 of door 12 includes a recess extending longitudinally and facing outwardly of the vehicle for receiving baffle support 30. Alternatively, baffle support 30 could be provided by another component of the vehicle, or another component coupled to the vehicle. As shown in the drawings, B-pillar 22 is part of rear door 12, and rear door 12 defines window opening 16 for containing window 14 for movement relative thereto between a range of positions established between a fully raised or closed window position and a fully lowered or open window position. Opening 16 includes an upper edge surface 32 and a lower edge surface 34 interconnected by a front side surface 36 and a rear side surface 38 which define a "height" dimension therebetween. Window 14 is received in a window regulator 40 that is operably disposed between outer panel 20 and an inner panel of door 12. Window regulator 40 can be of any suitable configuration for retaining window 14 for movement between its closed and open window positions.

Figure 12:
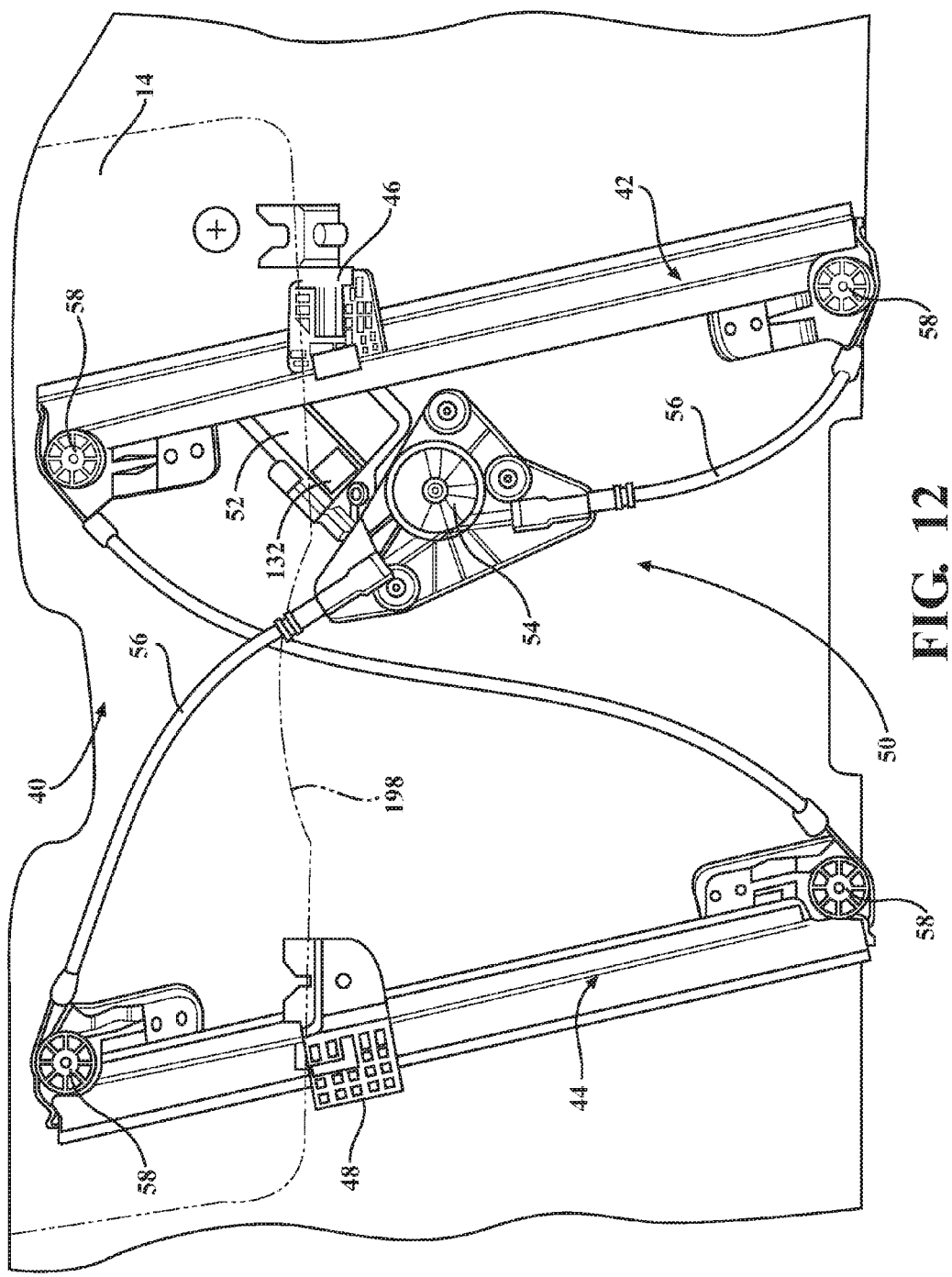
FIG. 12 is a perspective view of a window regulator operable for controlling movement of the window in the rear door.

Referring to FIG. 12, a non-limiting example of window regulator 40 is shown for moving window 14 between its open and closed positions. Window regulator 40 generally includes a first or front guide rail 42, a second or rear guide rail 44, a first or front lifter 46, a second or rear lifter 48, and a cable drive assembly 50. Each guide rail 42 and 44 has a corresponding one of lifters 46 and 48 thereon. Lifters 46 and 48 are moveable up and down on guide rails 42 and 44 between an upper position which corresponds to the closed position of window 14 and a lower position which corresponds to the open position of window 14. Lifters 46 and 48 are shown in FIG. 12 in an intermediate position located between the upper and lower positions.

Cable drive assembly 50 connects lifters 46 and 48 and drives lifters 46 and 48 up and down along guide rails 42 and 44 between the upper and lower positions. Cable drive assembly 50 may be any suitable cable drive assembly known in the art. For example, cable drive assembly 50 may include a window regulator electric motor 52, a drum 54, and a plurality of cables 56 that extend from drum 54 around pulleys 58 or the like and connect to lifters 46 and 48. Rotation of a motor output associated with electric motor 52 causes cables 56 to be wound and unwound relative to drum 54 so as to drive lifters 46 and 48 up and down along guide rails 42 and 44 and move window 14 up and down within window opening 16 of door 12.

Figure 1B:
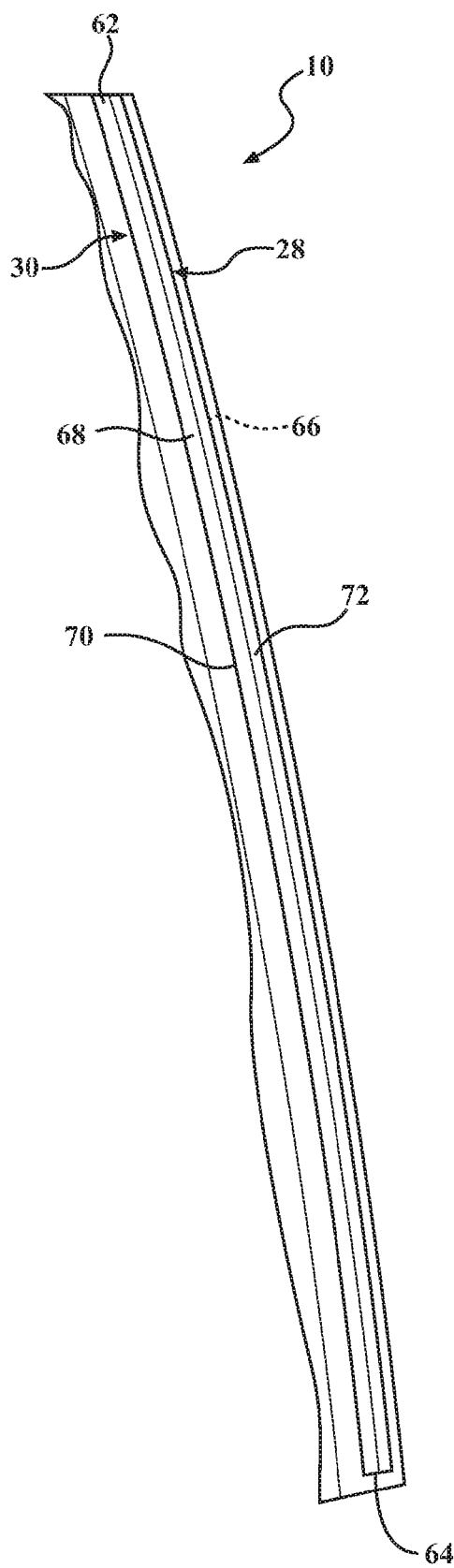
FIG. 1B is an enlarged view of the baffle of the noise alleviating apparatus shown in FIG. 1.

An enlarged view of baffle 28, as used in noise alleviating apparatus 10 of FIG. 1, is shown in FIG. 1B. Baffle 28 extends longitudinally over at least a portion of the height of window opening 16 from an upper end 62 to a lower end 64. Baffle 28 presents a length between upper end 62 and lower end 64. The length of baffle 28 is preferably greater than half of the height of window opening 16 which contains window 14. Baffle 28 also extends horizontally from a front edge 66 to a rear edge 68 and outwardly from an inner edge 70 to an outer edge 72. Baffle 28 presents a width between front edge 66 and rear edge 68, and a thickness between inner edge 70 and outer edge 72. In the example embodiment, the width and the thickness are constant between upper end 62 and the lower end 64. However, the geometry of baffle 28 can change in view of various factors and is not limited to that shown in the drawings.

Noise alleviating apparatus 10 further includes an actuation mechanism 80. Actuation mechanism 80 is operable to move baffle 28 from a first or "retracted" position relative to baffle support 30 to a second "deployed" position away from baffle support 30 when window 14 is lowered from its fully closed position toward its fully open position to create an air passage into the cabin. This occurs when a driver or passenger of the vehicle wants fresh air to enter the cabin. Preferably, baffle 28 is actuated to move from its retracted position to its deployed position when window 14 has been lowered within opening 16 to a predetermined lowered window position. This predetermined lowered window position is selected to be the window position at which window buffeting can be heard by the vehicle occupants and/or the window position at which vibrations associated with the window buffeting can be felt by the vehicle occupants. The predetermined lowered window position varies depending on the particular application, as it depends in part on the size and shape of the vehicle, the geometry of window opening 16, and the volume of the vehicle cabin. Actuation mechanism 80 also functions to retract baffle 28 from its deployed position into its retracted position with respect to baffle support 30 when window 14 reaches a predetermined raised window position, for example when the driver or passenger closes window 14. The predetermined lowered window position of the window 14 may be the same as the predetermined raised window position of window 14. However, the system could be designed so that these two actuation positions are different from one another.

When window 14 reaches the predetermined lowered window position, baffle 28 is located in its deployed position such that it extends outwardly from an outer surface 78 of baffle support 30, as best shown in FIGS. 1A, 2A, and 3, and which defines an "activated" mode of apparatus 10. When window 14 reaches the predetermined raised position, baffle 28 is located in its retracted position such that it is flush with or disposed inward of outer surface 78, and which defines a "deactivated" mode for apparatus 10. In the activated mode, baffle 28 deflects air flow along outer surface 78 of the vehicle, and thus reduces or eliminates the undesirable window buffeting and the overall noise. Outer surface 78 of baffle support 30 is preferably mounted to be flush with an outer surface of B-pillar 22.

Actuation mechanism 80 of noise alleviating apparatus 10 can comprise various different designs, for example those shown in FIGS. 1-3. In noise alleviating apparatus 10 of FIG. 1, actuation mechanism 80 includes a rack and pinion mechanism 84 for automatically moving baffle 28 to its deployed position and subsequently automatically retracting baffle 28 to its retracted position in response to movement of window 14. Actuation mechanism 80 also includes an electric motor, or window noise actuator motor 82, to drive rack and pinion mechanism 84, and a flexible drive shaft 86 coupling window noise actuator motor 82 to rack and pinion mechanism 84. In this embodiment, window noise actuator motor 82 is referred to as a CDL motor and is contained in a motor mount housing 85. Rack and pinion mechanism 84 is contained in a chamber formed in baffle support 30 behind baffle 28. As best shown in FIG. 1A, rack and pinion mechanism 84 includes a pair of gears 90 disposed adjacent to opposite ends 62 and 64 of baffle 28. Rack and pinion mechanism 84 also includes a pair of gear shaft bearings 92 each disposed along a gear shaft 94 between gears 90. Rotation of gear shaft 94 in a first direction is caused by rotation of drive shaft 86 in a first direction upon actuation of window noise actuator motor 82 which, in turn, causes gears 90 of rack and pinion mechanism 84 to move along gear shaft 94 for moving baffle 28 outward of baffle support 30 to its deployed position. Such actuation of window noise actuator motor 82 in the first direction may start when window 14 reaches the predetermined lowered window position. In contrast, rotation of gear shaft 94 in a second direction is caused by rotation of drive shaft 86 in a second direction upon actuation of window noise actuator motor 82 which, in turn, causes gears 90 to move along gear shaft 94 for moving baffle 28 from its deployed position back to its retracted position when window 14 is raised to its predetermined raised position.

FIG. 4 is a logic flow chart illustrating a non-limiting method for reducing noise and vibration associated with opening of window 14 in the automotive vehicle using noise alleviating apparatus 10 of FIG. 1. In this embodiment, the method includes the step of activating a window switch 100, which may be automatically activated when the vehicle starts or intentionally activated by the driver or passenger of the vehicle. Next, at step 102, the system determines whether the vehicle is in motion. This step 102 can be conducted by an electronic control unit (ECU) of the vehicle, or another component. If the vehicle is in motion, then the method next includes the step 104 of determining the position of window 14. When window 14 is being lowered via actuation of window regulator motor 52, the system determines at step 106 whether window 14 has been lowered to, or past, its predetermined lowered window position. Once window 14 is at the predetermined lowered window position, actuation mechanism 80 is activated to move baffle 28 outward of baffle support 30 to its deployed position as indicated by step 108. Thus, baffle 28 thereafter functions to deflect air and alleviate the window buffeting, as indicated by step 110. When window 14 is raised from its predetermined lowered window position to the predetermined raised position, as indicated by step 112, actuation mechanism 80 is activated (step 114) to retract baffle 28 back into baffle support 30 since window buffeting is no longer a problem. In the system of FIG. 1, actuation mechanism 80 activates electric motor 82 which causes gears 90 to rotate and move baffle 28 from its deactivated/retracted position to its activated/deployed position, or vice versa. If the system determines window 14 is closed or has not reached the predetermined lower window position, then baffle 28 is not activated.

Referring to FIG. 5, a control system 120 for power-operated control of window regulator 40 and noise alleviating apparatus 10 is shown to include an electronic controller unit (ECU) 122 configured to receive certain input signals and control actuation of window regulator motor 52 and window noise actuator motor 82. Specifically, an input signal from a window switch 124 is identified by a lead line 126 while an input signal from the vehicle's body control module (BCM) 128 is identified by a lead line 130. Window switch 124 provides an input signal 126 indicative of whether window 14 is requested to be raised or lowered within window opening 16. Based on this input signal, ECU 122 controls actuation of window regulator motor 52. Likewise, input signal 130 is indicative of a vehicle operating characteristics such as, for example, the vehicle's road speed. A window position sensor may be utilized to provide ECU 122 with an input signal indicative of the position of window 14 within window opening 16. Such a window position sensor may be integrated directly into window regulator motor 52, as indicated schematically by block 132 in FIG. 12, and be operable for providing ECU 122 with a signal indicative of when window 14 has been lowered into its predetermined lowered window position as well as when window 14 has subsequently been raised to its predetermined raised window position via operation of window regulator 40. FIG. 6 illustrates an alternative control system 120' configured to provide ECU 122 with a window position signal by a lead line 140 based on a movement of window 14 (or regulator 40) with respect to a glass position sensor 142. Position sensor 142 can be located in various alternative locations such as between an edge of window 14 on one of side surfaces 36, 38 of window opening 16 or between one of lifters 46, 48 and guide rails 42, 44.

In the example embodiment shown in FIG. 2, a mechanically-actuated version of noise alleviating apparatus 10A is shown installed in door 12. Apparatus 10A is still equipped with a moveable baffle 28 and a baffle support 30, but now includes an alternative actuation mechanism 80A. Actuation mechanism 80A includes a pivot pin 162 disposed along baffle support 30 adjacent lower end 64 of baffle 28. Pivot pin 162 is disposed generally parallel to the direction of travel of the vehicle. In this embodiment, baffle 28 rotates about pivot pin 162 outwardly relative to baffle support 30 from a retracted position to a deployed position when window 14 reaches its predetermined lowered window position and rotates about pivot pin 162 from its deployed position back into its retracted position within baffle support 30 when window 14 reaches its predetermined raised window position. In this embodiment, actuation mechanism 80A further includes a lever cam 164, a cam support 166, a lift arm 168, and a spring 170. Lever cam 164, cam support 166, lift arm 168, and spring 170 are disposed along baffle support 30, as shown in FIG. 2. In operation, baffle 28 is automatically moved outwardly from outer surface 78 in response to engagement of baffle 28 with lift arm 168. When window 14 reaches its predetermined lowered window position, an upper edge of window 14 depresses lever cam 164 which, due to the linkage connection between lever cam 164 and lift arm 168, causes baffle 28 to rotate about pivot pin 162 and outwardly from baffle support 30 from its retracted position into its deployed position. When window 14 is subsequently raised and reaches its predetermined raised position, window 14 is released from engagement with lever cam 164 to permit baffle 28 to rotate about pivot pin 162 back into its retracted position within baffle support 30.

In the example embodiment of noise alleviating apparatus 10B shown in FIG. 3, actuation mechanism 80B again includes a pivot pin 162 disposed along baffle support 30 adjacent lower end 64 of baffle 28, as well as still including lever cam 164, cam support 166, and spring 170. However, in this embodiment, an actuating rod 172 couples lever cam 164 to baffle 28. When window 14 is lowered and reaches its predetermined lowered window position, a lower edge 198 (FIG. 12) of window 14 presses or engages lever cam 164 to automatically rotate baffle 28 about pivot pin 162 outwardly from baffle support 30 from its retracted position to its deployed position. When window 14 is subsequently raised and reaches its predetermined raised window position, window 14 is released from engagement with lever cam 164 to allow baffle 28 to rotate about pivot pin 16 from its deployed position to its retracted position back into baffle support 30.

FIG. 7 is a flow chart illustrating a method for alleviating noise and vibration associated with open window 14 of the automotive vehicle using noise alleviating apparatus 10B of FIG. 3. A similar method can be employed with noise alleviating apparatus 10A of FIG. 2. As shown in FIG. 7, the method first includes the step 200 of activating window 14, either manually or electronically. When window 14 is lowered to its predetermined lowered window position, lower edge 198 of window 14 presses lever cam 164 which causes actuating rod 172 to mechanically and automatically move baffle 28 outwardly relative to baffle support 30 to its deployed position as indicated by steps 202 and 204. When window 14 subsequently is raised to its predetermined raised window position, as noted by step 206, window 14 releases lever cam 164 which causes actuating rod 172 to automatically retract baffle 28 back into baffle support 30 and into its retracted position (step 208).

Figure 9:
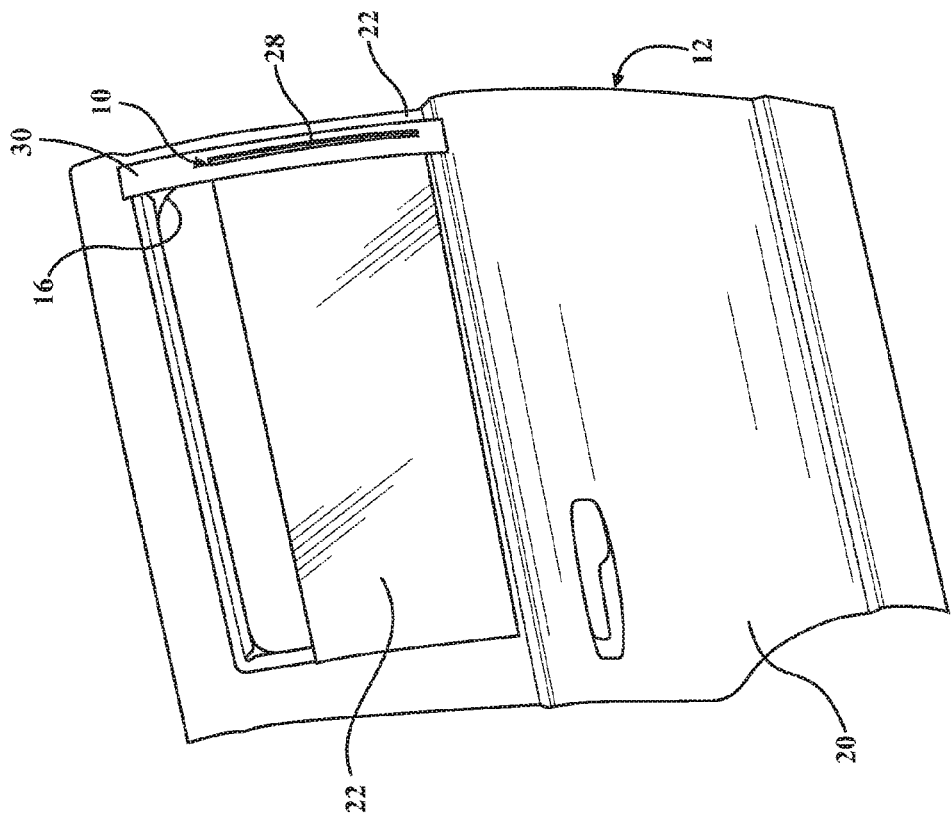
FIGS. 8-11 are perspective views of the rear door of the automotive vehicle, wherein the baffle is shown in a deactivated or retracted position (FIG. 8 and FIG. 10) and an activated or deployed position (FIG. 9 and FIG. 11)
Figure 8:
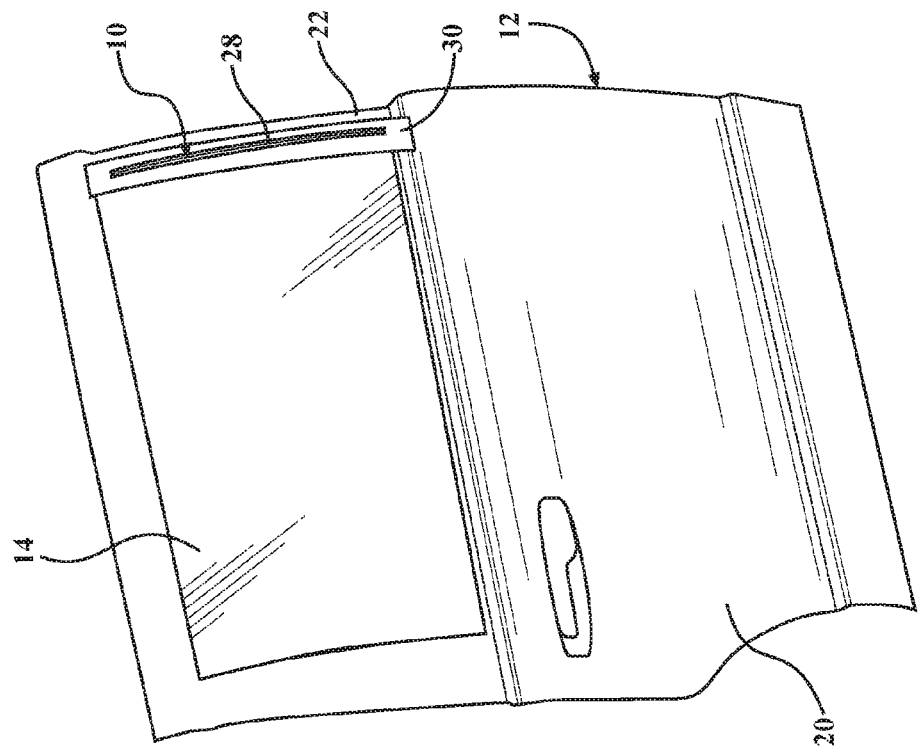
Figure 10:
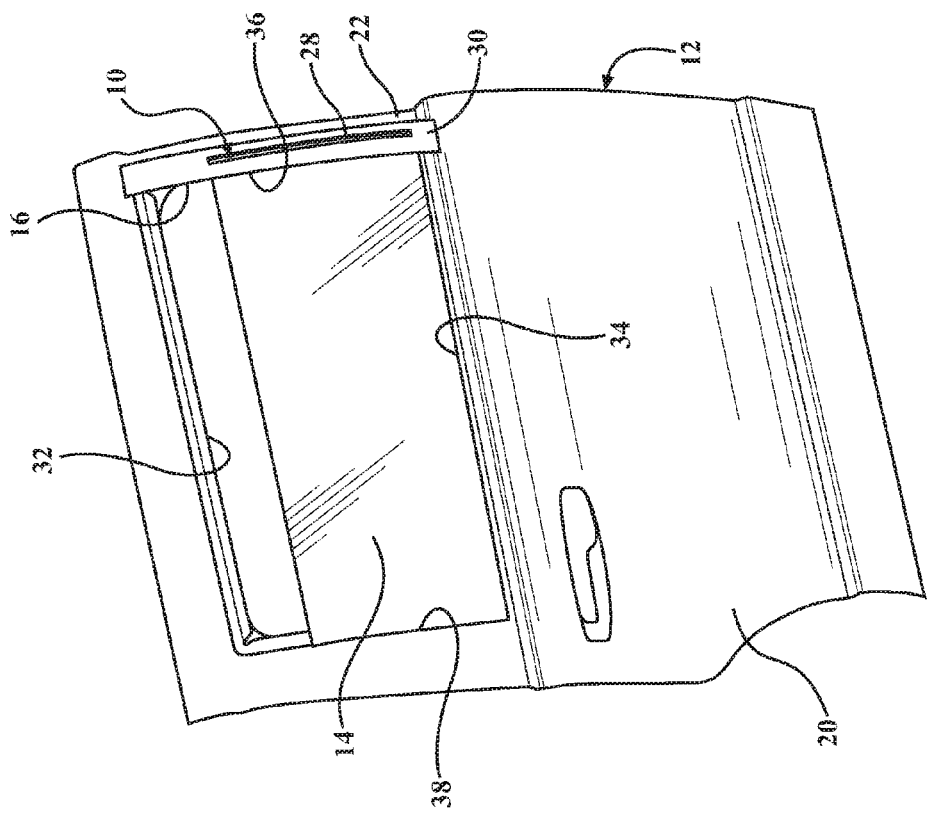
Figure 11:
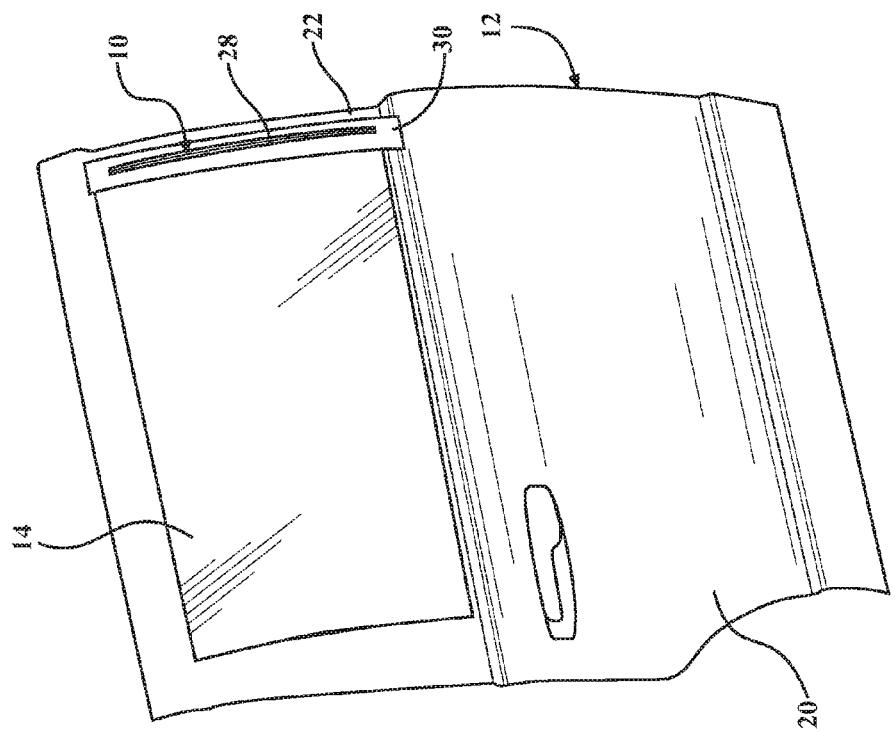

FIGS. 8-11 are perspective views of rear door 12 and window 14 of the automotive vehicle with outer panel 20 disposed over some of the components. FIGS. 8 and 10 show baffle 28 in the retracted position with noise alleviating apparatus 10, 10A, 10B operating in its non-activated mode. In contrast, FIGS. 9 and 11 show baffle 28 in the deployed position with noise alleviating apparatus 10, 10A, 10B operating in its activated mode. Noise alleviating apparatus 10 is typically disposed along rear door 12, specifically along B-pillar 22 of rear door 12, since an open rear window 12 is known to generate the most window buffeting noise. However, noise alleviating apparatus 10, 10A, 10B could be disposed in other locations.

A method for manufacturing noise alleviating apparatus 10 described above is also provided. The method generally includes disposing baffle support 30 forward of window 22 of the vehicle, disposing baffle 28 in baffle support 30 for movement between retracted and deployed positions, and disposing actuation mechanism 80 along baffle support 30.

In one example embodiment, the method includes disposing electric motor 82 in a location spaced from baffle support 30, disposing rack and pinion mechanism 84 along baffle support 30, and coupling electric motor 82 to rack and pinion mechanism 84 with flexible drive shaft 86, as shown in FIG. 1. As discussed above, rack and pinion mechanism 84 moves baffle 28 outward of baffle support 30 when window 14 reaches its predetermined lowered window position and retracts baffle 28 back into baffle support 30 when window 14 reaches its predetermined raised window position.

In another example embodiment, the method includes disposing the pivot pin 162 along lower end 64 of baffle 28. This embodiment further includes disposing the lever cam 164, cam support 166, lift arm 168, and spring 170 along baffle support 30, as shown in FIG. 2. As discussed above, window 14 forcibly depresses lever cam 164 to automatically rotate baffle 28 about pivot pin 162 and move outwardly of baffle support 30 when window 14 reaches its predetermined lowered window position. Window 14 also releases lever cam 164 to automatically rotate baffle 28 about pivot pin 162 and back into baffle support 30 when window 14 reaches its predetermined raised window position.

In yet another example embodiment, the method includes disposing pivot pin 162 along an end of baffle 28; disposing a lever cam 164, cam support 166, and spring 170 in a location spaced from baffle support 30; and coupling lever cam 64 to baffle 28 with actuating rod 172, as shown in FIG. 3. As discussed above, window 14 presses lever cam 164 to rotate baffle 28 about pivot pin 162 and move outwardly of baffle support 30 when window 14 reaches its predetermined lowered window position. Window 14 also releases lever cam 164 to rotate baffle 28 about pivot pin 162 and back into baffle support 30 when window 14 reaches its predetermined raised window position.

A method for alleviating noise along a window 14 in a door 12 of an automotive vehicle is also provided. The method generally includes moving baffle 28 outward of outer surface 78 of the vehicle when window 14 reaches its predetermined lowered position, and retracting baffle 28 when window 14 reaches its predetermined raised position. Baffle 28 can be moved between its retracted/non-active and its deployed/active positions by various different techniques, as described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A noise alleviating apparatus associated with a door of a motor vehicle for alleviating noise caused in response to movement of a window within a window opening of the door, the noise alleviating apparatus comprising:
   a baffle support mounted to a forward vertically-extending pillar section of the door adjacent to the window opening;
   a baffle supported by the baffle support for movement between a retracted position disposed within the baffle support and a deployed position extending outwardly from the baffle support; and
   a power-operated actuation mechanism connected to the baffle and operable for moving the baffle from its retracted position into its deployed position in response to a detection that the window has moved from a closed position to a predetermined lowered window position within the window opening, the actuation mechanism further operable for moving the baffle from its deployed position to its retracted position in response to a detection that the window has moved from an open position to a predetermined raised window position within the window opening.

2. The noise alleviating apparatus of claim 1 further including a window position sensor operable to detect the position of the window within the window opening, wherein the power-operated actuator is coupled to the baffle and operable to move the baffle to its deployed position when the window position sensor detects movement of the window to its predetermined lowered window position and is further operable to move the baffle to its retracted position when the window position sensor detects movement of the window to its predetermined raised window position.

3. The noise alleviating apparatus of claim 2 wherein the predetermined lowered window position is different than the predetermined raised window position.

4. The noise alleviating apparatus of claim 2 wherein the power-operated actuator includes an electric motor and a connection mechanism interconnecting the electric motor to the baffle, and wherein the window position sensor provides a signal to a motor controller operable for controlling actuation of the electric motor to move the baffle between its retracted and deployed positions.

5. The noise alleviating apparatus of claim 4 wherein the window position sensor is associated with the electric motor.

6. The noise alleviating apparatus of claim 4 wherein the window position sensor is configured to detect the position of a window regulator mechanism supporting the window within the door and which is moveable between a lowered position and a raised position to move the window between its open and closed positions within the window opening.

7. The noise alleviating apparatus of claim 6 wherein the window regulator mechanism is connected to a second electric motor for controlling movement of the window regulator mechanism between its lowered and raised positions within the door.

8. The noise alleviating apparatus of claim 4 wherein the connection mechanism includes a rack and pinion mechanism having a rack coupled to the baffle, and a drive shaft interconnecting the electric motor to one or more pinions of the rack and pinion mechanism, wherein movement of the pinion along the rack in a first direction results in movement of the baffle toward its deployed position, and wherein movement of the pinion along the rack in a second direction results in movement of the baffle toward its retracted position.

9. The noise alleviating apparatus of claim 4 wherein a first end of the baffle is pivotably connected about a pivot joint to the baffle support, and wherein the connection mechanism is operable to pivot the baffle about the pivot joint from its retracted position into its deployed position.

10. A noise alleviating apparatus associated with a door of a motor vehicle for alleviating noise caused in response to movement of a window within a window opening of the door, the noise alleviating apparatus comprising:
a baffle support mounted to a forward vertically-extending pillar section of the door adjacent to the window opening and extending between an upper end and a lower end;
a baffle supported by the baffle support and extending along a length substantially between the upper and lower ends of the baffle support for movement between a retracted position disposed within the baffle support and a deployed position extending outwardly from the baffle support;
an actuation mechanism connected to the baffle and operable for moving the baffle from its retracted position into its deployed position in response to the window moving from a closed position to a predetermined lowered window position within the window opening, the actuation mechanism further operable for moving the baffle from its deployed position to its retracted position in response to the window moving from an open position to a predetermined raised window position within the window opening;
wherein the actuation mechanism includes a pivot pin disposed at the lower end of the baffle support in perpendicular relationship with the length of the baffle and configured to pivotably support a first end of the baffle relative to the baffle support, wherein the baffle pivots about the pivot pin from its retracted position into its deployed position in response to the window moving within the opening to its predetermined lowered window position, and wherein the baffle pivots about the pivot pin from its deployed position into its retracted position in response to the window moving in the opening to its predetermined raised window position.

11. The noise alleviating apparatus of claim 10 wherein the actuation mechanism further includes a lever cam and a lift arm connecting the baffle to the lever arm, wherein the window forcibly acts on the lever cam upon movement into its predetermined lowered window position which causes the lift arm to pivotably move the baffle about the pivot pin from its retracted position into its deployed position, and wherein the window is released from engagement with the lever cam upon movement to its predetermined raised window position which causes the lift arm to pivotably move the baffle from its deployed position into its retracted position.

12. The noise alleviating apparatus of claim 1 wherein the door is a rear door of the vehicle, and wherein the pillar section of the door is a B-pillar.

13. A noise alleviating apparatus associated with a door of a motor vehicle for alleviating noise caused in response to movement of a window within a window opening of the door, the noise alleviating apparatus comprising:
a baffle support mounted to a forward vertically-extending pillar section of the door adjacent to the window opening;
a baffle supported by the baffle support for movement between a retracted position disposed within the baffle support and a deployed position extending outwardly from the baffle support; and
a power-operated actuation mechanism operable for moving the baffle from its retracted position into is deployed position in response to a detection that the window has moved from a closed position to a predetermined lowered window position within the window opening, the power-operated actuation mechanism further operable for moving the baffle from its deployed position to its retracted position in response to a detection that the window has moved from an open position to a predetermined raised window position within the window opening; and
a control system including an electronic controller and a window position sensor operable to detect the position of the window within the window opening and provide a window position signal to the controller, wherein the power-operated actuation mechanism is coupled to the baffle and operable to move the baffle to its deployed position when the window position sensor detects movement of the window to its predetermined lowered window position and is further operable to move the baffle to its retracted position when the window position sensor detects movement of the window to its predetermined raised window position.

14. The noise alleviating apparatus of claim 13 wherein the predetermined lowered window position is different than the predetermined raised window position.

15. The noise alleviating apparatus of claim 13 wherein the power-operated actuation mechanism includes an electric motor and a connection mechanism interconnecting the electric motor to the baffle, and wherein the window position sensor provides the window position signal to the electronic controller for controlling actuation of the electric motor to cause the connection mechanism to move the baffle between its retracted and deployed positions.

16. The noise alleviating apparatus of claim 15 wherein the window position sensor is associated with the electric motor.

17. The noise alleviating apparatus of claim 15 wherein the window position sensor is configured to detect the position of a window regulator mechanism supporting the window within the door and which is moveable between a lowered position and a raised position to move the window between its open and closed positions within the window opening.

18. The noise alleviating apparatus of claim 17 wherein the window regulator mechanism is connected to a second electric motor for controlling movement of the window regulator mechanism between its lowered and raised positions within the door.

19. The noise alleviating apparatus of claim 15 wherein the connection mechanism includes a rack and pinion mechanism having a rack coupled to the baffle, and a drive shaft interconnecting the electric motor to one or more pinions of the rack and pinion mechanism, wherein movement of the pinion along the rack in a first direction results in movement of the baffle toward its deployed position, and wherein movement of the pinion along the rack in a second direction results in movement of the baffle toward its retracted position.

* * * * *